Dec. 16, 1930.  C. A. BELZ  1,785,110
COMBINED COMPRESSED AIR HOSE AND AIR PRESSURE GAUGE
Filed July 19, 1929
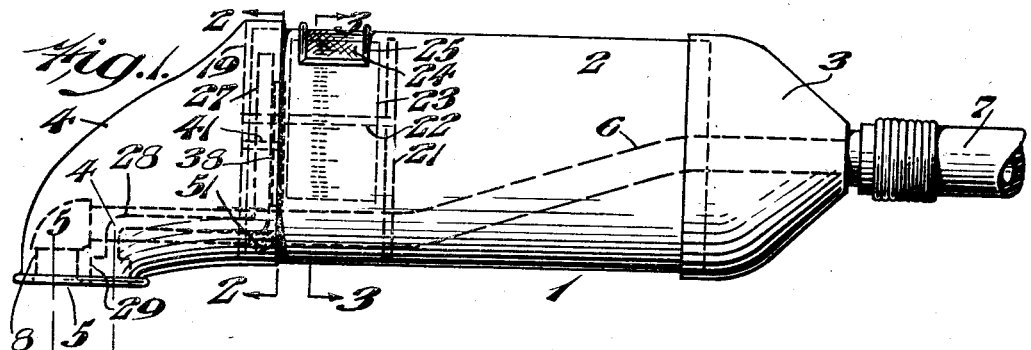
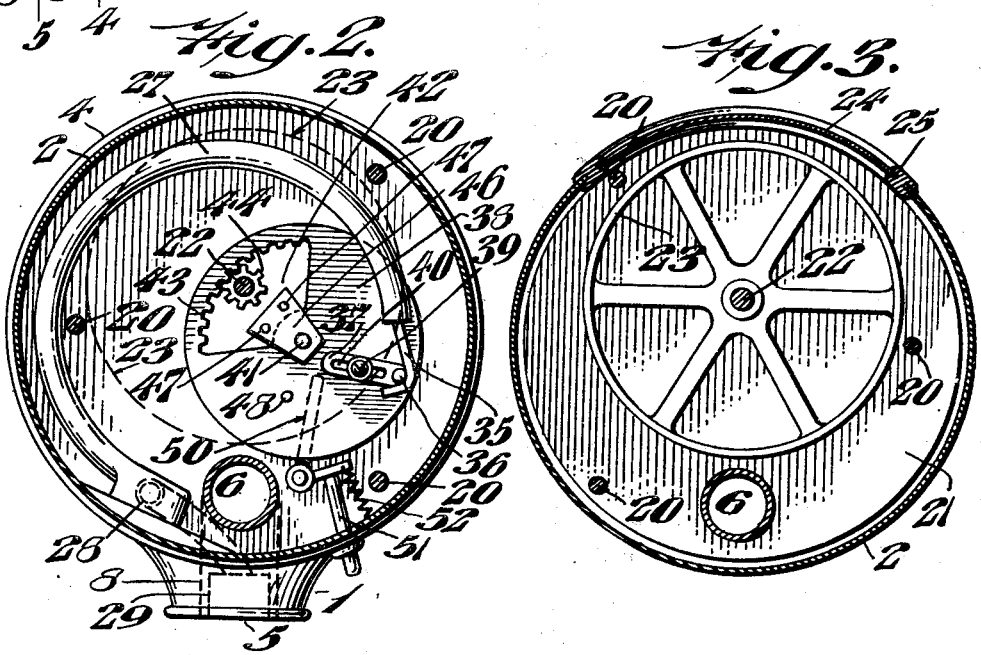
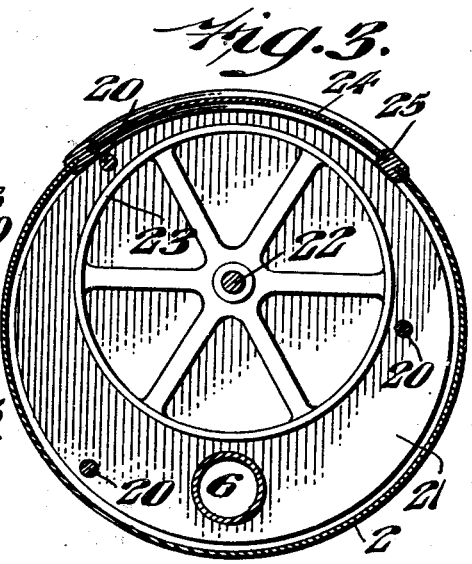
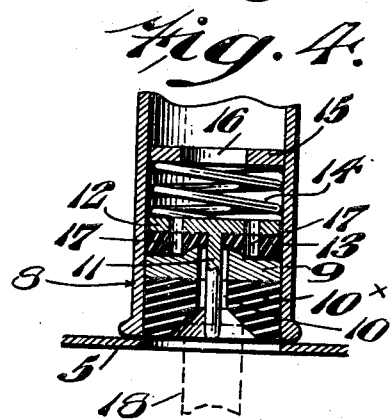
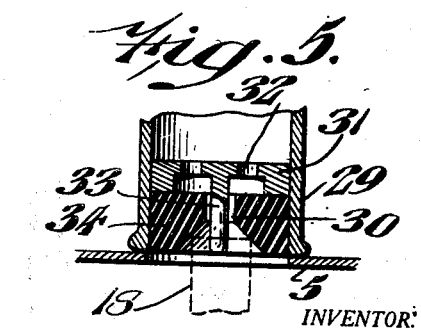
INVENTOR:
CHARLES A. BELZ
BY
ATTORNEYS Patented Dec. 16, 1930

1,785,110

UNITED STATES PATENT OFFICE

CHARLES A. BELZ, OF ARCOLA, PENNSYLVANIA

COMBINED COMPRESSED-AIR HOSE AND AIR-PRESSURE GAUGE

Application filed July 19, 1929. Serial No. 379,457.

My invention relates to a new and useful combined compressed air hose and air pressure gauge, whereby compressed air may be supplied to any desired point, and whereby the air pressure at said point may be ascertained, by the use of a unitary instrument.

As is well known in the automobile field, it is necessary that the tires be inflated to a predetermined pressure, depending upon the type and size of the tire, and it has been the practice heretofore to supply the air under pressure from a hose connected to a force pump, and to measure or ascertain the pressure of the air within the tire by means of an air gauge which is separate and distinct. This necessitated the use of two independent and separate appliances and it resulted in the loss, misplacement, and frequently the theft of the air gauge.

It is the object of my invention to provide a combined compressed air hose and air pressure gauge in a unitary construction and assembly, whereby the loss, misplacement and theft of the air gauge is entirely eliminated and whereby the use or application of the compressed air hose and the air pressure gauge is greatly facilitated.

To the above ends, my invention consists of an open ended hollow handle, an air pressure gauge positioned within said handle, and having its inlet end enclosed in the front end of said handle, and a compressed air hose leading from a force pump and passing through said handle, the discharge end of said hose being adjacent the intake end of said gauge, whereby said hose and said gauge may be manipulated as a unit, and whereby they be applied to the valve tire alternately as desired.

My invention further consists of various other novel features of construction and advantage all as hereinafter described and claimed.

In the accompanying drawings:

Figure 1, represents a side elevation of a combined compressed air hose and air pressure gauge embodying my invention.

Figure 2, represents on an enlarged scale, a section on line —2—2 of Figure 1.

Figure 3, represents on an enlarged scale, a section on line —3— of Figure 1.

Figures 4 and 5 represent fragmentary sectional views showing details of construction, taken on lines 4—4 and 5—5 of Figure 1 respectively.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts, 1 designates a combined compressed air hose and air pressure gauge embodying my invention, comprising a hollow handle 2, the rear cap or closure 3 and the front cap or casing 4 having the nozzle 5. The rear cap 3 and the front casing 4 may be screwed or otherwise detachably secured to the handle 2 to afford access to the interior construction. 6 designates a compressed air pipe the rear end 7 of which communicates with a source of compressed air not shown, and which extends through the rear cap 3, the handle 2 and the front casing 4, and terminates in the discharge nozzle or outlet 8. The outlet end 8 of the pipe 6 is provided with a conventional valve mechanism, comprising the plate 9 having the port 10 therein, in which is adapted to seat the stem 11 carried by the plate 12 which carries the gasket 13 and which is urged downwardly or outwardly by the spring 14 confined therebetween and the upper plate 15 having the port 16. The nozzle 8 is also provided with the gasket $10^x$ to prevent leakage of air when said nozzle is applied to the tire valve 18. The plate 12 and gasket 13 have the through ports or holes 17, through which compressed air from the pipe 6 is permitted to flow into the tire valve 18, when the stem 11 is raised against the tension of the spring 14 by the application of the nozzle 8 of the compressed air pipe 6 to the valve 18 of the tire, in the usual manner.

Within the inner end of the front cap or casing 4 is suitably secured the plate 19, which carries the bolts 20 which carry at their other ends the plate 21. The plates 19 and 21 form bearings for the shaft 22 which carries the drum 23 having the outer graduations 24 which are exposed to view through the window 25 provided in the upper portion of the handle casing 2, as will be understood from Figure 1. 27 designates a spring coil pipe which is provided with the pipe or tube 28 extending through the casing 4 and terminating in the inlet or intake end 29 which comprises the fixed plate 31 having the ports 32 and the stem 33 which is adapted to open the valve tire 18 in the usual manner, there being a gasket having the port 30 for preventing air leakage when the device is in use. The coil pipe 27 is suitably secured in place and carries the hook 35 which engages the pin 36, on the arm 37, which is secured to the disc 38 by the screw 39 engaging the adjustment slot 40. The disc 38 is loose on the stub shaft 41 and is provided with the cut out portion 42 which has the inner toothed segment 43 which is adapted to engage the pinion 44 on the shaft 22 as will be understood from Figure 2. A plate 46 is fast on the shaft 41 and carries the lugs or pins 47 which project through the cut out portion 42 and form stops to limit the movement of the disc 38 on the stub shaft 41. The disc 38 is provided with the pin or lug 48, which is adapted to be engaged by the bell crank 50 which is adapted to be actuated from without by the pin or rod 51. 52 designates a spring for actuating the bell crank 50 to return the disc 38 to its normal zero position.

The operation is as follows:

Compressed air is supplied to the tire (not shown) by the application of the discharge end or nozzle 8 of the pipe 6 to the tire valve 18. When it is desired to gauge the air pressure within the tire, the nozzle 29 is applied to the tire valve 18, whereupon the stem 33 is raised and air, under pressure, is permitted to flow through the port 30 in the gasket 34, and through the ports 32, through the pipe 28 into the coil tube 27. The air pressure expands the coil tube 27 which tends to assume a straight instead of a curved position, thus exerting a pull on the pin 36 engaged by the hook 35. This revolves the disc 38 in a counterclockwise direction, and the toothed segment 43 engaging the pinion 44 revolves the shaft 22 which carries the drum 23, thereby revolving the latter to bring the appropriate graduations 24 into registration with the window 25 thus indicating the amount of pressure exerted by the air escaping from the tire valve 18. When the graduations or markings 24 on the drum 23 have been read, the stem 51 is depressed to actuate the bell crank 50 which then engages the pin 48 on the disc 38 to return the latter and hence the drum 23 on the shaft 22 into the original position which is marked zero.

It will thus be seen that I have devised a novel combined compressed air hose and air pressure gauge in a single unitary appliance, whereby the tire of an automobile or the like may be inflated to the desired extent and whereby the air pressure within the tire may be gauged. By thus combining the two instruments into a single unitary appliance, I effect a considerable saving in time which is essential in large garages, service stations and filling stations, and I also obviate the risk of mislaying the air gauge which frequently happens, and I eliminate the danger of having the gauge stolen by passing motorists who stop to check the air pressure in tires and drive off with the gauge.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. In a device of the character stated, a cap formed with a nozzle, said cap being secured to a handle, a pair of pipes arranged in said cap, one of said pipes leading to and communicting with an air pressure gauge secured in said handle, there being a window in the handle, said window disclosing a portion of said air gauge.

2. In a device of the character stated, an elongated casing forming a handle, said handle being closed at front and rear ends by caps, one of said caps being formed with a nozzle, a pair of pipes arranged in said cap with a nozzle, one of said pipes leading to and communicating with an air pressure gauge secured in said handle and front cap, said gauge being visible through a window formed in the handle, the other of said pipes passing through the cap and handle.

3. A combined air hose and pressure gauge comprising a casing forming a handle, a nozzle cap on the front end of said casing, a pressure gauge in said casing, and a pair of pipes extending through said casing and said cap and terminating in adjacent nozzles in the front end of said cap, one of said pipes leading to a source of compressed air and the other of said pipes leading to said pressure gauge, there being a window in said casing disclosing a portion of said gauge.

CHARLES A. BELZ.